United States Patent
Stenneth et al.

(10) Patent No.: US 11,535,258 B2
(45) Date of Patent: Dec. 27, 2022

(54) METHOD AND APPARATUS FOR VERIFYING RAIN EVENT WARNINGS

(71) Applicant: HERE Global B.V., Eindhoven (NL)

(72) Inventors: Leon Stenneth, Chicago, IL (US); Amarnath Nayak, Mumbai (IN); Alex Averbuch, Buffalo Grove, IL (US); Ram Marappan, Naperville, IL (US)

(73) Assignee: HERE GLOBAL B.V., Eindhoven (NL)

(*) Notice: Subject to any disclaimer, the term of this patent is extended or adjusted under 35 U.S.C. 154(b) by 50 days.

(21) Appl. No.: 17/087,089

(22) Filed: Nov. 2, 2020

(65) Prior Publication Data

US 2022/0135043 A1    May 5, 2022

(51) Int. Cl.
| | |
|---|---|
| *B60W 40/06* | (2012.01) |
| *G01C 21/36* | (2006.01) |
| *G08G 1/0967* | (2006.01) |
| *B60W 50/00* | (2006.01) |

(52) U.S. Cl.
CPC ......... *B60W 40/06* (2013.01); *G01C 21/3691* (2013.01); *B60W 50/0097* (2013.01); *B60W 2555/20* (2020.02); *B60W 2556/20* (2020.02); *B60W 2556/25* (2020.02); *B60W 2556/45* (2020.02); *B60W 2756/10* (2020.02); *G08G 1/0967* (2013.01)

(58) Field of Classification Search
CPC ............. B60W 40/06; B60W 2556/25; B60W 2756/10; B60W 2556/45; B60W 2555/20; B60W 50/0097; B60W 2556/20; G01C 21/3691; G08G 1/0967
See application file for complete search history.

(56) References Cited

U.S. PATENT DOCUMENTS 9,411,072 B1   8/2016  Dixon et al.
10,522,022 B2  12/2019  Smith et al.
(Continued)

OTHER PUBLICATIONS

Turlapaty, Anish Chand, Application of Pattern Recognition and Adaptive DSP Methods for Spatio Temporal Analysis of Satellite Based Hydrological Datasets, May 2020, Mississippi State University (Year: 2020).*

(Continued)

*Primary Examiner* — Hunter B Lonsberry
*Assistant Examiner* — Jay Khandpur
(74) *Attorney, Agent, or Firm* — Alston & Bird LLP

(57) ABSTRACT

A method, apparatus and computer program product for determining a rain event warning are described herein. In the context of a method, an indication of the rain event warning for one or more locations may be received. The method may obtain, for a respective rain event warning, sensor data corresponding to a weather condition within a region that includes the location with which the respective rain event warning is associated. The method may evaluate the sensor data to determine whether the sensor data is indicative of the weather condition (e.g., rain). The method may determine a rain event warning confidence based at least in part on evaluation of the sensor data. The method may cause the rain event warning to be published in an instance in which the rain event warning confidence satisfies a confidence threshold.

18 Claims, 6 Drawing Sheets

(56) References Cited

U.S. PATENT DOCUMENTS

| | | | |
|---|---|---|---|
| 2016/0178803 A1* | 6/2016 | Haas | G06T 7/90 |
| | | | 702/3 |
| 2016/0282860 A1* | 9/2016 | Freese, V | G01L 23/22 |
| 2017/0161614 A1* | 6/2017 | Mehta | G06N 20/00 |
| 2018/0009418 A1* | 1/2018 | Newman | B08B 3/02 |
| 2018/0164119 A1* | 6/2018 | Becker | G01W 1/06 |
| 2019/0049256 A1 | 2/2019 | Camp et al. | |
| 2019/0353499 A1 | 11/2019 | Stenneth | |

OTHER PUBLICATIONS

Benevides et al., *Neural Network Approach to Forecast Hourly Intense Rainfall Using GNSS Precipitable Water Vapor and Meteorological Sensors*, State University (SPSU) Research Paper, Publication Date: Apr. 23, 2019.

Heinzler et al., *Weather Influence and Classification with Automotive Lidar Sensors*, Institute for Information Processing Technology (ITIV), Karlsruhe Institute of Technology (KIT) Research Paper Publication Date: Jun. 18, 2019.

\* cited by examiner

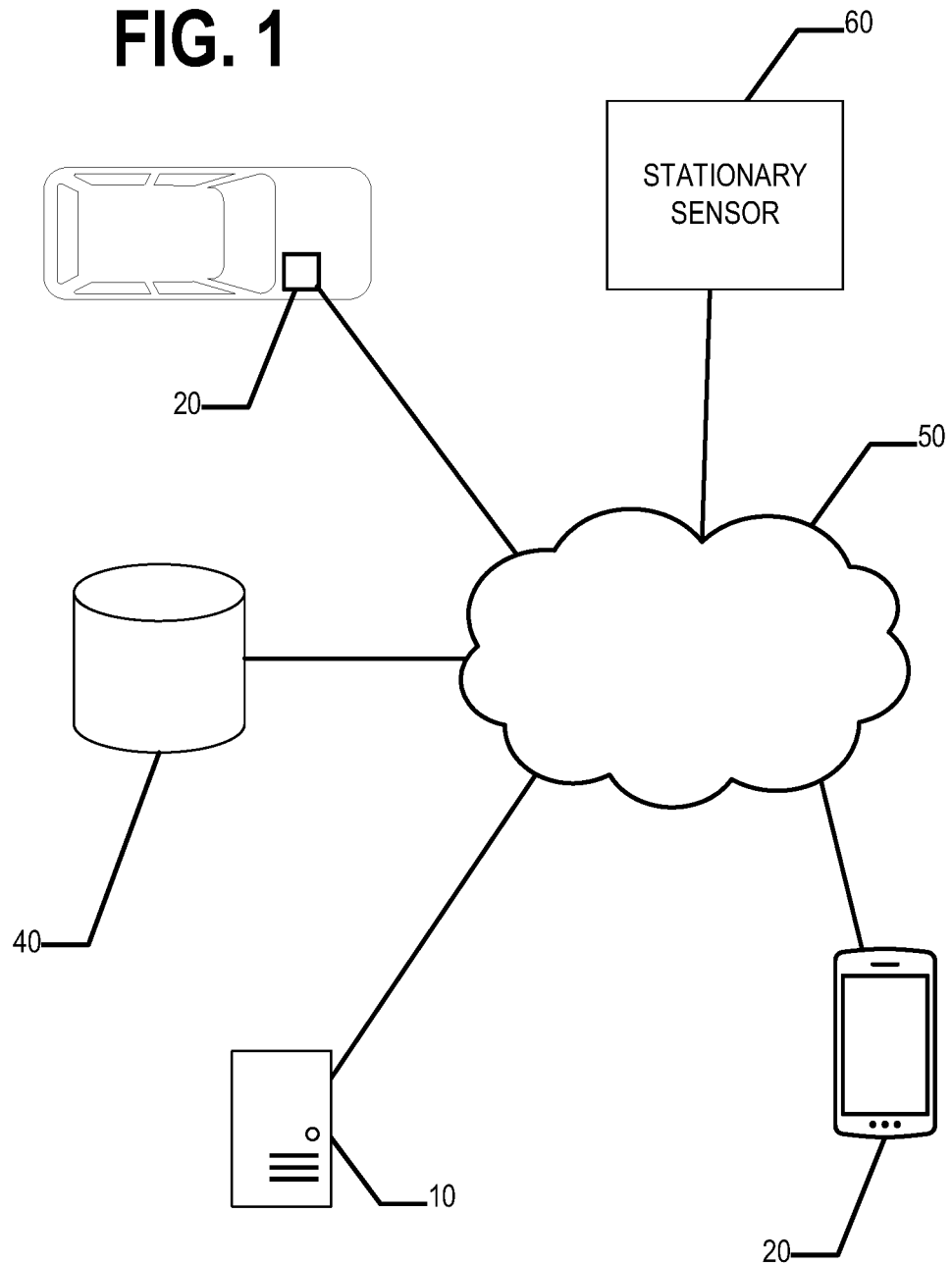

METHOD AND APPARATUS FOR VERIFYING RAIN EVENT WARNINGS

TECHNOLOGICAL FIELD

Example embodiments relate generally to a method, apparatus and computer program product for determining a rain event warning confidence for one or more locations and for publishing a corresponding rain event warning based on the rain event warning confidence.

BACKGROUND

A rain event warning corresponding with one or more locations may be generated based on vehicle sensor data that satisfies certain conditions. For example, a combination of particular vehicle speeds and activation of vehicle features (e.g., windshield wipers) can trigger generation of a rain event warning. Such rain event warnings may subsequently be published (e.g., transmitted for display in conjunction with a mapping or navigation system).

In some cases, vehicle sensor data based on inconsistent driver behavior in response to rain may cause the generation of rain event warnings to be inaccurate, such as by causing generation of false positive rain event warnings. This inaccuracy may lead to drivers placing less confidence in such rain event warnings, thereby potentially devaluing these warnings.

BRIEF SUMMARY

A method, apparatus and computer program product are provided for determining a rain event warning confidence, and causing publication of a rain event warning based at least in part on the rain event warning confidence. By causing publication of the rain event warning based on the rain event warning confidence, publication of false positive rain event warnings can be suppressed. As a result, the likelihood that the rain event warnings that are published accurately identify a weather condition indicating rain is increased, thereby giving drivers greater confidence in such warnings.

In an example embodiment, a computer-implemented method for determining a rain event warning confidence is provided. The method comprises receiving an indication of the rain event warning for one or more locations. The method comprises, for a respective rain event warning, obtaining sensor data corresponding to a weather condition within a region that includes the location with which the respective rain event warning is associated. The method comprises evaluating the sensor data to determine whether the sensor data is indicative of rain. The method comprises determining the rain event warning confidence based at least in part on evaluation of the sensor data.

The method may comprise identifying, for the respective rain event warning, one or more sensors within the region based on the location of the rain event warning. Obtaining sensor data may comprise obtaining sensor data for a time that is within a predefined period of time from a time associated with the rain event warning. Obtaining sensor data may comprise obtaining sensor data from one or more stationary sensors within the region with which the respective rain event warning is associated. Obtaining sensor data may comprise obtaining one or more images depicting the weather condition within the region with which the respective rain event warning is associated. Determining the rain event warning confidence may comprise determining a ratio of a number of rain event warnings for which the one or more images within the regions with which the rain event warning are associated are identified to not represent rain to a total number of rain warning events, and wherein the total number of rain event warnings comprise a sum of a number of rain event warnings for which the one or more images within the region with which the rain event warnings are associated are identified to represent rain and the number of rain event warnings for which the one or more images within the region with which the rain event warnings are associated are identified to not represent rain. Evaluating the sensor data to determine whether the sensor data is indicative of rain may comprise identifying the one or more images within the regions with which the respective rain event warning is associated to not represent rain in an instance in which a majority of the one or more images are determined to not represent rain and identifying the one or more images within the regions with which the respective rain event warning is associated to represent rain in an instance in which a majority of the one or more images are determined to represent rain. The method may comprise causing the rain event warning to be published by causing the rain event warning to be transmitted for display in conjunction with a mapping or navigation system.

In another example embodiment, an apparatus may be configured to determine a rain event warning confidence. The apparatus may comprise processing circuitry and at least one memory including computer program code instructions with the computer program code instructions configured to, when executed by the processing circuitry, cause the apparatus to receive an indication of the rain event warning for one or more locations. The computer program code instructions are also configured to, for a respective rain warning event, obtain sensor data corresponding to a weather condition within a region that includes the location with which the respective rain event warning is associated. The computer program code instructions are also configured to evaluate the sensor data to determine whether the sensor data is indicative of rain. The computer program code instructions are also configured to determine the rain event warning confidence based at least in part on evaluation of the sensor data.

The computer program code instructions may also be configured to cause the apparatus to, for the respective rain event warning, identify one or more sensors within the region based on the location of the rain event warning. The computer code instructions may also be configured to cause the apparatus to obtain sensor data for a time that is within a predefined period of time from a time associated with the rain event warning. The computer program code instructions may also be configured to cause the apparatus to obtain sensor data from one or more stationary sensors within the region. The computer program code instructions may also be configured to cause the apparatus to obtain one or more images depicting the weather condition within the region with which the respective rain event warning is associated. The computer program code instructions may also be configured to cause the apparatus to determine the rain event warning confidence by determining a ratio of a number of rain event warnings for which the one or more images within the regions with which the rain event warnings are associated are identified to not represent rain to a total number of rain event warnings, and wherein the total number of rain event warnings comprise a sum of a number of rain event warning for which the one or more images within the regions with which the rain event warnings are associated are identified to represent rain and the number of rain event warnings for which the one or more images within the regions with which the rain event warnings are associated are identified to not represent rain. The computer program code instructions may also be configured to cause the apparatus to evaluate the sensor data to determine whether the sensor data is indicative of rain by identifying the one or more images within the regions with which the respective rain event warning is associated to not represent rain in an instance in which a majority of the one or more images are determined to not represent rain and identifying the one or more images within the regions with which the respective rain event warning is associated to represent rain in an instance in which a majority of the one or more images are determined to represent rain. The computer program code instructions are also configured to cause the apparatus to cause the rain event warning to be published in an instance in which the rain event warning confidence satisfies a confidence threshold.

In a further example embodiment, a computer program product may be configured to determine a rain event warning confidence. The computer program product may comprise at least one non-transitory computer readable storage medium having computer-executable program code instructions stored therein with the computer-executable program code instructions including program code instructions configured, upon execution, to receive an indication of the rain event warning for one or more locations. The program code instructions are also configured, upon execution, to, for a respective rain event warning, obtain sensor data corresponding to a weather condition within a region that includes the location with which the respective rain event warning is associated. The program code instructions are also configured, upon execution, to evaluate the sensor data to determine whether the sensor data is indicative of rain. The program code instructions are also configured, upon execution, to determine the rain event warning confidence based at least in part on evaluation of the sensor data.

The program code instructions may also be configured, upon execution, to identify, for the respective rain event warning, one or more sensors within the region based on the location. The program code instructions may also be configured, upon execution, to obtain sensor data for a time that is within a predefined period of time from a time associated with the respective rain event warning. The program code instructions may also be configured, upon execution, to obtain one or more images depicting the weather condition within the region with which the respective rain event warning is associated. The program code instructions may also be configured, upon execution, to determine the rain event warning confidence by determining a ratio of a number of rain event warnings for which the one or more images within the regions with which the rain event warnings are associated are identified to not represent rain to a total number of rain event warnings, and wherein the total number of rain event warnings comprise a sum of a number of rain event warning for which the one or more images within the regions with which the rain event warnings are associated are identified to represent rain and the number of rain event warnings for which the one or more images within the regions with which the rain event warnings are associated are identified to not represent rain. The program code instructions may also be configured, upon execution, to evaluate the sensor data to determine whether the sensor data is indicative of rain by identifying the one or more images within the regions with which the respective rain event warning is associated to not represent rain in an instance in which a majority of the one or more images are determined to not represent rain and identifying the one or more images within the regions with which the respective rain event warning is associated to represent rain in an instance in which a majority of the one or more images are determined to represent rain. The program code instructions may also be configured, upon execution, to cause the rain event warning to be published in an instance in which the rain event warning confidence satisfies a confidence threshold.

BRIEF DESCRIPTION OF THE DRAWINGS

Figure 2A:
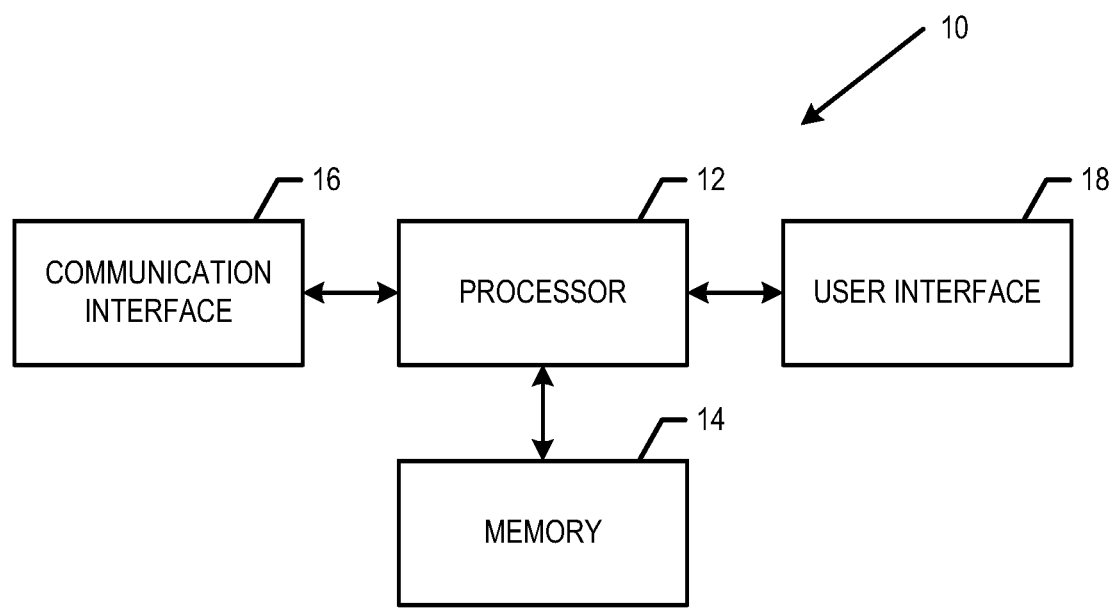
Figure 2B:
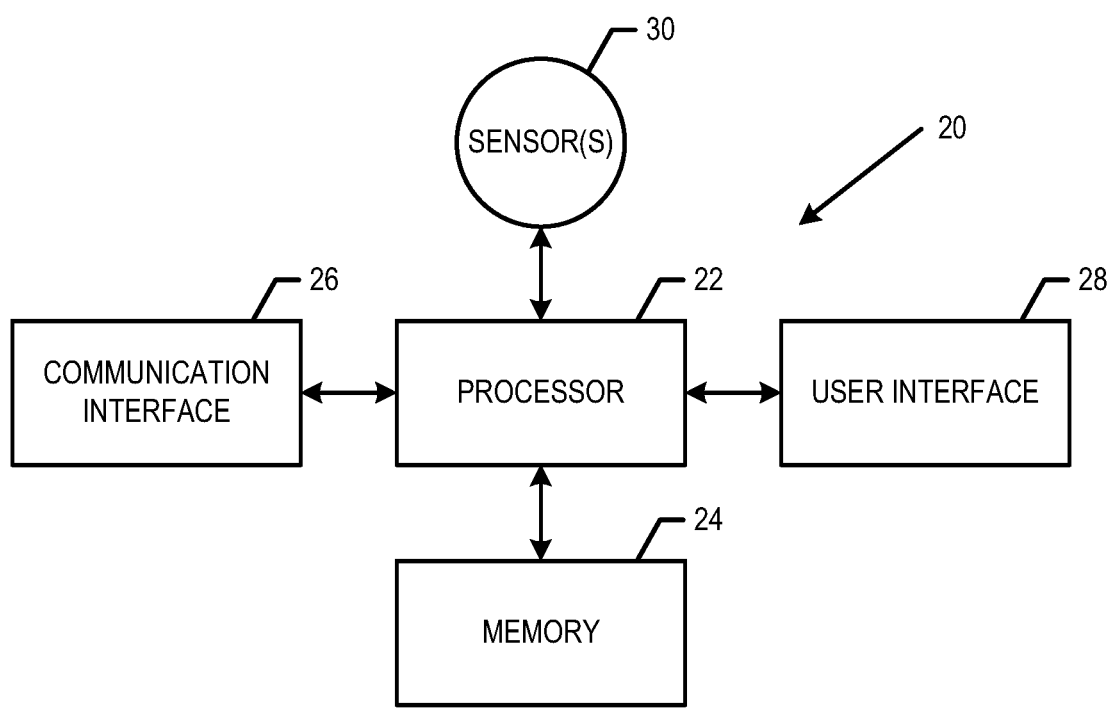
Figure 3:
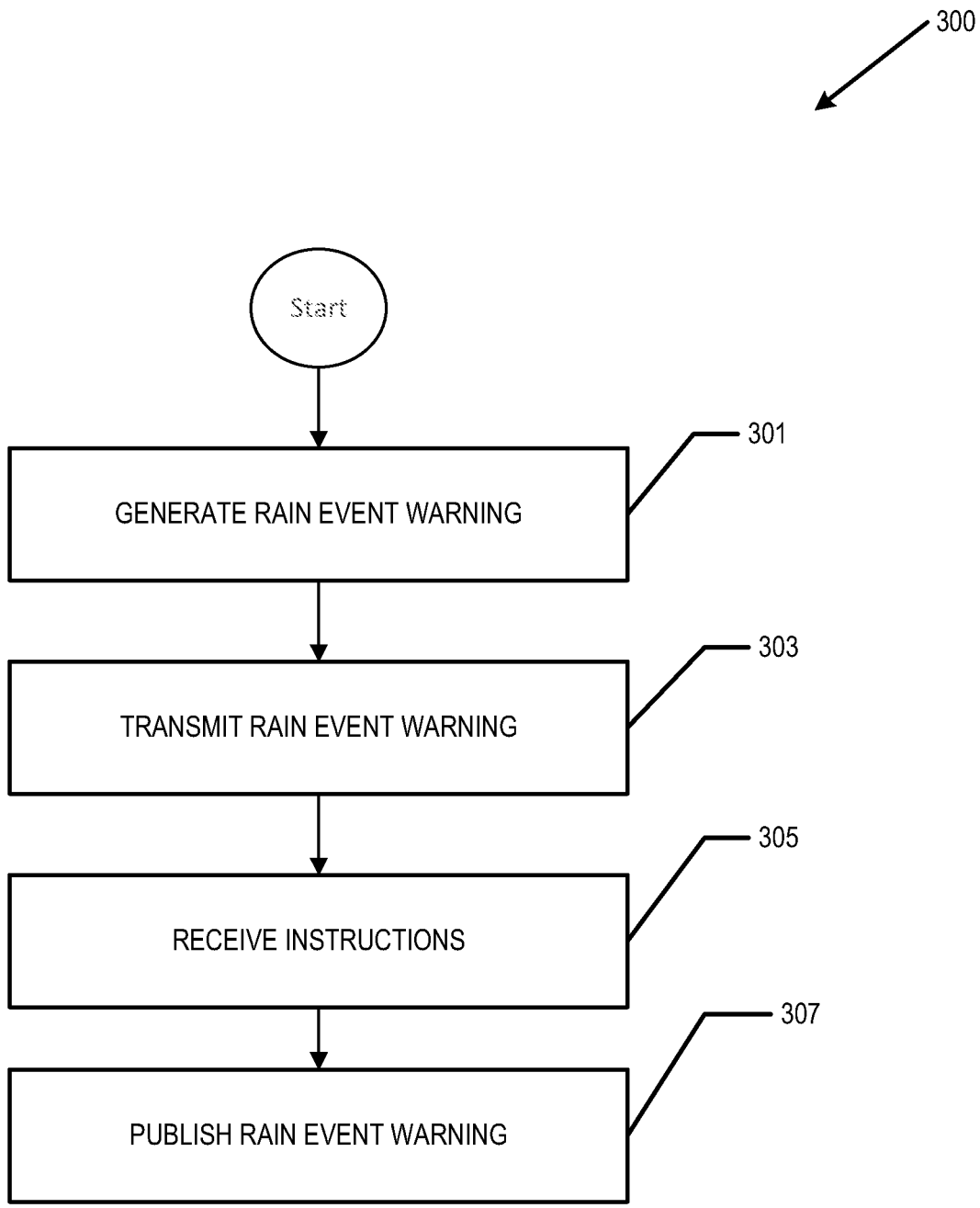
Figure 4:
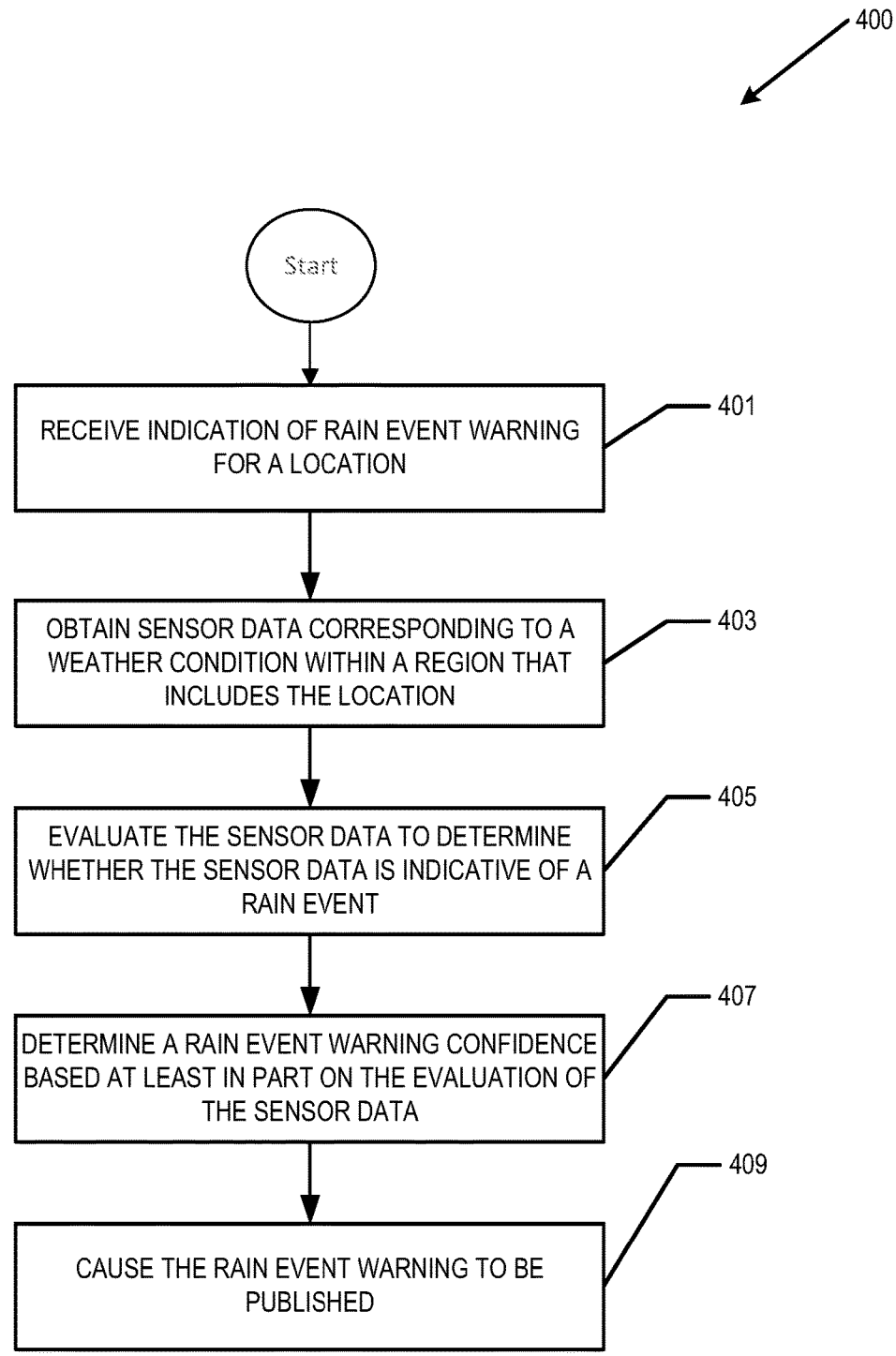
Figure 5:
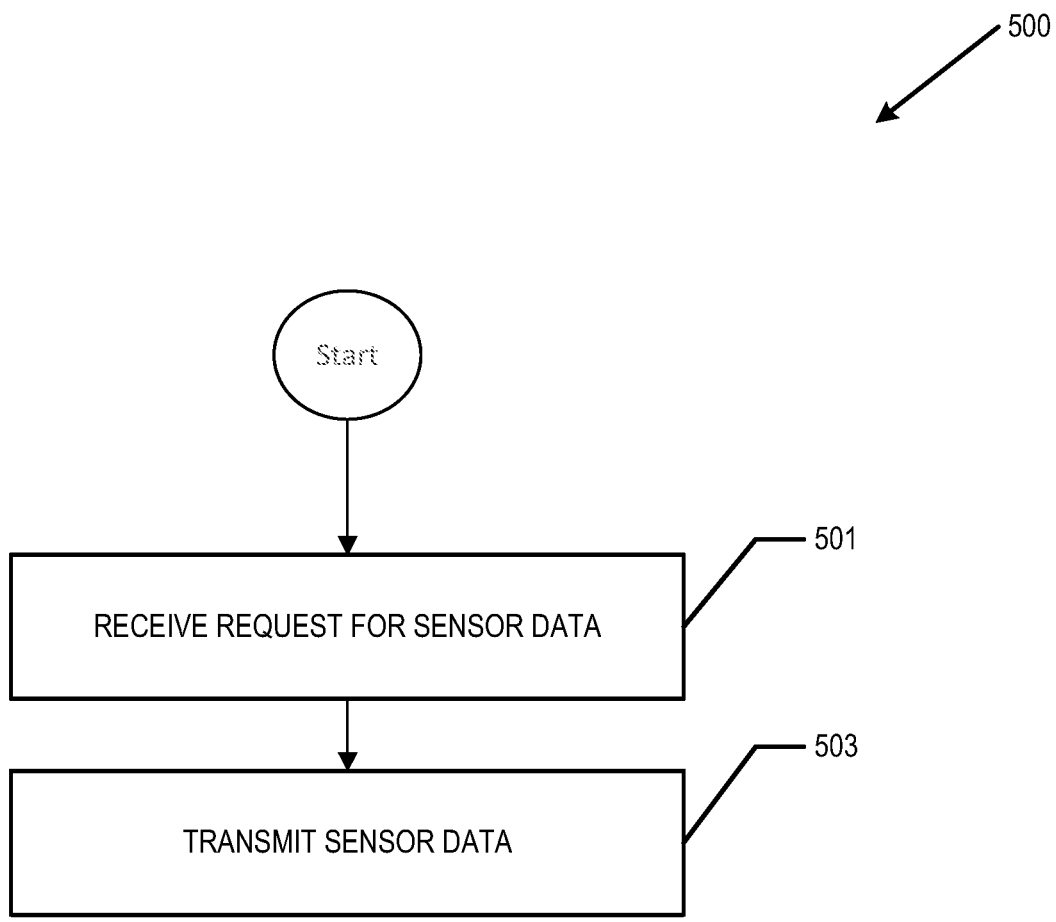

Having thus described certain example embodiments in general terms, reference will hereinafter be made to the accompanying drawings, which are not necessarily drawn to scale, and wherein:

FIG. 1 is a block diagram showing an example architecture of one embodiment of the present invention;

FIG. 2A is a block diagram of a computing entity that may be specifically configured in accordance with an example embodiment;

FIG. 2B is a block diagram of a vehicle apparatus that may be specifically configured in accordance with an example embodiment;

FIG. 3 is a flowchart illustrating operations performed, such as by the vehicle apparatus of FIG. 2B, in accordance with an example embodiment;

FIG. 4 is a flowchart illustrating operations performed, such as by the computing entity of FIG. 2A, in accordance with an example embodiment; and FIG. 5 is a flowchart illustrating operations performed, such as by the stationary sensor of FIG. 2B, in accordance with an example embodiment.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

I. General Overview

A method, apparatus and computer program product for determining a rain event warning confidence for a location are described herein. Though many of the embodiments are described in the context of a rain event warning, the method, apparatus and computer program product may be utilized to determine an event warning confidence for other road conditions such as flood, heavy rain, fog, slippery roads, accidents, disabled vehicles and the like.

FIG. 1 provides an illustration of an example system that can be used in conjunction with various embodiments of the present invention. As shown in FIG. 1, the system may include one or more vehicle apparatuses 20, one or more computing entities 10 (e.g., servers), one or more stationary sensors 60, one or more networks 50, and/or the like. In various embodiments, the vehicle apparatus 20 may be an in-vehicle navigation system, vehicle control system, a mobile computing device, and/or the like. For example, a vehicle apparatus 20 may be an in-vehicle navigation system mounted within and/or on-board a vehicle such as a motor vehicle, automobile, car, scooter, truck, van, bus, motorcycle, bicycle, Segway, golf cart, and/or the like, a non-motor vehicle, etc. In other embodiments, the vehicle apparatus 20 may be a smartphone, tablet, personal digital assistant (PDA), and/or other mobile computing device. In some embodiments, the one or more stationary sensors 60 may be or comprise one or more image sensors configured to capture images of the environment at a location.

In example embodiments, a computing entity 10 may be in communication with the vehicle apparatus 20 and stationary sensor 60 and may comprise components similar to those shown in FIG. 2A, while the vehicle apparatus 20 and stationary sensor 60 may comprise components similar to those shown in FIG. 2B. In various embodiments, the computing entity 10 may be located remotely from the vehicle apparatus 20, while in other embodiments, the computing entity and the vehicle apparatus may be collocated, such as within a vehicle. Each of the components of the system, including one or more vehicle apparatuses 20, one or more stationary sensors 60 and one or more computing entities 10, may be in communication with one another over the same or different wireless or wired networks 50 including, for example, a wired or wireless Personal Area Network (PAN), Local Area Network (LAN), Metropolitan Area Network (MAN), Wide Area Network (WAN), cellular network, and/or the like. In some embodiments, a network 50 may comprise the automotive cloud, digital transportation infrastructure (DTI), radio data system (RDS)/high definition radio (HD) or other digital radio system, and/or the like. For example, a vehicle apparatus 20 or stationary sensor 60 may be in communication with a computing entity 10 via the network 50 and/or via the Cloud.

As shown in FIG. 2A, the computing entity 10 may comprise a processor 12, memory 14, and optionally a user interface 18, a communications interface 16, and/or other components configured to perform various operations, procedures, functions or the like described herein. Similarly, as shown in FIG. 2B, the vehicle apparatus 20 and the stationary sensor 60 may comprise a processor 22, memory 24, a communications interface 26, a user interface 28, one or more sensors 30 (e.g., a location sensor such as a global positioning system (GPS) sensor; camera(s); two dimensional (2D) and/or three dimensional (3D) light detection and ranging (LiDAR) sensor(s); long, medium, and/or short range radio detection and ranging (RADAR) sensor(s); ultrasonic sensors; electromagnetic sensors; (near-) infrared (IR) cameras, 3D cameras, 360° cameras, accelerometer(s), gyroscope(s), and/or other sensors), and/or other components configured to perform various operations, procedures, functions or the like described herein. With respect to the vehicle apparatus 20, the sensors help to determine one or more features of the corresponding vehicle's surroundings, while with the stationary sensor 60, the sensors enable the determination of a weather condition (e.g., rain, fog, and/or the like) at a location. Similarly, example embodiments of the vehicle apparatus 20, stationary sensor 60 and the computing entity 10 are described in more detail below with respect to FIGS. 2A and 2B.

II. Example Operations

In example embodiments, one or more sensors 30 associated with and/or in communication with a vehicle apparatus 20 may gather, capture, record, and/or measure sensor information/data. The vehicle apparatus 20 may generate a rain event warning based on the sensor information/data. The computing entity 10 may receive an indication of a rain event warning for one or more locations from one or more vehicle apparatuses 20. The computing entity 10 may identify one or more locations corresponding with the rain event warning. Identifying the one or more locations may comprise determining a region that includes the one or more locations from one or more databases 40. The computing entity 10 may, for a respective rain event warning, obtain (e.g., request) sensor data corresponding to a weather condition within a region that includes the location with which the respective rain event warning is associated. One or more remote devices (e.g., stationary sensors 60) corresponding with the location (e.g., within a region that includes the location) may provide (e.g., transmit, send) the sensor data to the computing entity 10. The stationary sensors 60 may be or comprise image sensors and/or the like. The computing entity 10 may receive and evaluate (e.g., analyze) the sensor data obtained from the plurality of remote devices (e.g., stationary sensors 60). The computing entity 10 may determine a rain event warning confidence based at least in part on the sensor data/information. The sensor data/information may comprise images, weather information and/or the like. The computing entity 10 may transmit an indication (e.g., a signal or a message) over the network 50 to one or more vehicle apparatuses 20 based on the determined rain event warning confidence. For example, the computing entity 10 may transmit an indication to one or more vehicle apparatuses 20 to cause publication of the rain event warning. Causing publication of the rain event warning may comprise transmitting an indication to one or more remote devices/vehicle apparatuses 20 for presentation (e.g., display) or audible announcement in conjunction with a mapping or navigation system.

FIG. 3 provides a flowchart of operations 300 performed by the vehicle apparatus 20, according to an example embodiment.

Beginning at block 301, the vehicle apparatus 20 includes means, such as a processor 22, for generating a rain event warning based on vehicle sensor information/data. The vehicle apparatus 20 generates a rain event warning based on sensor information/data that satisfies one or a plurality of conditions. For example, a vehicle apparatus 20 may generate a rain event warning when the windshield wipers are manually or automatically activated for more than a threshold time period (e.g., 15 seconds) and the vehicle speed is below a threshold speed (e.g., 60 miles per hour). The vehicle threshold speed may be absolute or relative (e.g., 60 miles per hour or more than 5 miles below the speed limit at the vehicle location). In other embodiments, the computing entity 10, such as the processor 12, may generate the rain event warning based on vehicle sensor information/data received from the one or more vehicle apparatuses 20.

At block 303, the vehicle apparatus 20 includes means, such as the processor 22, the communication interface 26 or the like, for transmitting an indication of the rain event warning over the network 50 to the computing entity 10. The indication of the rain event warning may comprise data such as a message or a data object that describes the rain event warning. In some embodiments, the rain event warning may be generated and/or transmitted from a separate remote computing device that aggregates data/information from a plurality of vehicle apparatuses 20.

FIG. 4 provides a flowchart of operations 400 performed by the computing entity 10 to determine a rain event warning confidence, according to an example embodiment.

Starting at block 401, the computing entity 10 includes means, such as the processor 12, the communication interface 16 or the like, for receiving an indication of the rain event warning over the network 50 (e.g., from one or more vehicle apparatuses 20) for one or more locations. Additionally, the computing entity 10 may identify one or more locations corresponding with the rain event warning. An example location may be or comprise one or more points, lines (e.g., roads) or regions (e.g., polygons) corresponding with a geographical location on a map at which the rain event warning was generated and with which the rain event warning is otherwise associated. In one embodiment, a database 40 may store definitions of a plurality of regions bounded by respective polygons. An example polygon may bound a region that comprises multiple roads within a corresponding portion of the map. Identifying a location may comprise generating a polygon including the location from which the one or more rain event warnings originated, such as by reference to the database 40.

In various embodiments, the computing entity 10, such as the processor 12, may identify (e.g., determine) a geographical region (e.g., polygon) corresponding with one or more geographical locations on a map. An example polygon may comprise multiple roads within a portion of the map. Identifying the one or more locations may comprise generating one or more polygons, each polygon including the location from which the respective rain event warning originated.

FIG. 5 is a flowchart illustrating operations performed by a stationary sensor 60, in accordance with an example embodiment. In various embodiments, the stationary sensor(s) 60 may be or comprise image apparatuses/sensors (e.g., traffic cameras). An embodiment of the stationary sensor 60 may also be represented by FIG. 2B.

At block 501, the stationary sensor 60 includes means, such as a processor 22, a communications interface 26 or the like, for receiving a request for sensor data/information from the computing entity 10 or other remote computing entity.

At block 503, the stationary sensor 60 includes means, such as the processor 22, the communications interface 26 or the like, for transmitting the sensor data/information (e.g., images, weather information) to the computing entity 10. The stationary sensor 60 may comprise means, such as a processor, communications interface, and/or the like, for transferring data to and receiving data from the computing entity 10. The data may comprise location data, image data, weather information, environmental data, combinations thereof and/or the like.

Returning to FIG. 4, at block 403, the computing entity 10 includes means, such as the processor 12, the communications interface 16 or the like, for obtaining (receiving) sensor data/information from one or more stationary sensors 60 or remote devices. For example, the computing entity 10 may comprise means, such as processor 12, the communication interface 16 and/or the like, for instructing the stationary sensor 60 to provide sensor data/information, such as sensor data and/or location data from the one or more locations or from a region including the one or more locations (e.g., from one or more stationary sensors 60 positioned within a region that includes the one or more locations).

In some embodiments, the computing entity 10, such as the processor 12, may identify one or more stationary sensors 60 within the region based on the location of the rain event warning (e.g., one or more stationary sensors 60 positioned within a region that includes the location of the rain event warning). For example, the computing entity 10, such as the processor 12, may identify one or more stationary sensors 60 based on an identification code associated with each stationary sensor 60 which, in turn, may be associated with a region. Then, the computing entity 10, such as the processor 12, the communication interface 16 or the like, may send a request to each identified stationary sensor 60 for images taken within a predefined period of time from a time associated with the respective rain event warning, such as the time at which the rain event warning was issued. Obtaining sensor data may comprise obtaining one or more images depicting the weather condition within the region with which the respective rain event warning is associated. In some embodiments, the image data may include data indicating a location and timestamp associated with each image. The computing entity 10, such as the processor 12, may obtain images corresponding with the location that were taken within a predefined period of time from a time associated with the respective rain event warning. In this regard, the images may comprise images collected or reported within a window of time that includes the time at which the rain event warning was generated or images collected or reported at a time that is closest to the time at which the rain event warning was generated.

Alternatively, in some embodiments, the computing entity 10, such as the processor 12, the communications interface 16 or the like, may transmit a request to one or more remote computing entities for sensor data/information corresponding with the one or more locations (e.g., obtain sensor data from a region that includes the location with which the respective rain event warning is associated). A remote computing entity may aggregate the sensor data/information (e.g., image data, weather information and/or the like) and transmit the sensor data/information to the computing entity 10. In some embodiments, the remote computing entity may continuously or repeatedly update (maintain) a database of available images received from remote devices (e.g., stationary sensors 60, vehicle apparatuses 20 and/or the like). In such embodiments, each image in the database 40 may be stored in association with a corresponding location and timestamp. The remote computing entity may receive as input a request for images corresponding with one or more locations or a region (e.g., a polygon) that includes the one or more locations from the computing entity 10. The remote computing entity may obtain and transmit the images to the computing entity 10.

Determining a Rain Event Warning Confidence

At block 405, upon receipt of the sensor data/information, the computing entity 10 may comprise means, such as the processor 12 or the like, for evaluating the sensor data/information to determine (e.g., confirm) whether the sensor data is indicative of a weather condition (e.g., rain, fog and/or the like) corresponding with the event warning (rain event warning, fog event warning and/or the like) at the one or more locations.

In various embodiments, if the sensor data comprises images, upon receiving the images, the computing entity 10, such as the processor 12, may determine whether each image is indicative of (e.g., contains evidence of) rain or a different weather condition corresponding with the warning. An image indicative of rain may comprise visible water drops on the lens of the camera that captured the image, fog, clouds and/or the like. An image not indicative of rain may show clear and dry conditions. For example, the computing entity 10, such as the processor 12, may be configured to classify or tag the images and may assign a certainty score to each image. For example, the computing entity 10, such as the processor 12, may classify each image into one of three categories: "rain identified," "rain not certain," and "no rain." Images below a set threshold of certainty with respect to the category in which the images are to be classified may be discarded or a weight factor may be applied such that images classified above a given percentage of certainty are given more weight in the analysis. The image analysis may be manual, e.g. the images may be presented to humans interfacing with the system who assign tags and/or scores to each image. Alternatively, the analysis may be pursuant to an automated image analysis technique implemented by the processor 12 or other computing device. For example, a machine learning model utilizing computer vision algorithm(s) (e.g., a convolutional neural network) may be utilized by the processor 12 or other computing device to classify/tag the images.

The computing entity 10, such as the processor 12, may determine that the sensor data/information corresponding with a location (e.g., region, polygon and/or the like) is indicative of a weather condition (rain, fog and/or the like) based upon, such as by proportional to, a ratio of a number of images within the region that are identified to not represent rain to a total number of images within the region comprising a sum of a number of images within the region that are identified to represent rain and the number of images within the region that are identified to not represent rain. For example, the computing entity 10, such as the processor 12, may be configured to determine whether a location and respective event warning is indicative of rain in accordance with the following formula:

$$\text{Percentage of images indicative of rain} = \quad \text{Equation 1}$$
$$\frac{\Sigma \text{ number of images identified to not represent rain}}{\Sigma (\text{number of images identified to not represent rain} + \text{number of images identified to represent rain})} * 100\%$$

For example, if the computing entity 10 receives 100 images corresponding with a rain event warning, such as 100 images within the region containing the location at which the rain event warning was generated. and 83 images are classified as "rain identified," 5 images are classified as "rain not certain" and 12 images are classified as "rain not identified," then applying Equation 1 above, the percentage of images indicative of rain for the respective rain event warning is:

$$\frac{83}{83+12} * 100 = 87\%$$

The computing entity 10, such as the processor 12, of an example embodiment is configured to determine whether the sensor data for a respective rain event warning is indicative of rain by identifying one or more images within the regions with which the respective rain event warning is associated to not represent rain in an instance in which a majority of the one or more images are determined to not represent rain and identifying the one or more images within the regions with which the respective rain event warning is associated to represent rain in an instance in which a majority of the one or more images are determined to represent rain. Thus, in the above example, a majority of the images corresponding with the rain event warning (e.g., from within a region that includes the location with which the respective rain event warning is associated) are determined to represent rain.

In some embodiments, the computing entity 10 may comprise means, such as the processor 12, communication interface 16 and/or the like, for causing publication of the rain event warning based on whether the sensor data/ information corresponding with a respective rain event warning is indicative of rain.

At block 407, the computing entity 10 may comprise means, such as the processor 12, for determining a rain event warning confidence based at least in part on the sensor data/information provided by the one or more stationary sensors 60. At least a portion of the received information (e.g., sensor data) may be analyzed by the computing entity 10, such as the processor 12, to determine a rain event warning confidence based upon the information. For example, the computing entity 10, such as the processor 12, may be configured to receive and analyze sensor data from one or more stationary sensors 60. In this regard, the computing entity 10 may comprise means, such as processor 12, communications interface 16, and/or the like, for receiving and analyzing the received information. For example, the processor 12 may be configured to process the received information, such as by computer-executable instructions, that indicate which sensor information/data is to be used in the analysis, provide one or more algorithms or functions for performing the analysis, provide one or more coefficients and/or parameters to be used in accordance with an algorithm for performing the analysis, provide one or more guidelines for providing a response indicating a result of the analysis, and/or the like. In example embodiments, the computer-executable instructions may be configured in accordance with a standardized computer programming language, standardized vehicle language, coded for a standardized sensor access library, provided in a map provider language and configured to be translated from the map provider language into a common vehicle language or a vehicle specific language (e.g., by a translation module or other portion of the map), and/or the like. In an example embodiment, the computer-executable instructions may comprise a reference to a function repository and/or one or more coefficients and/or parameters to be used in the calculation or determination of the result of the referenced instructions, function, or algorithm.

The rain event warning confidence of an example embodiment may be or comprise a percentage or score, such as a false discovery rate with respect to a plurality of rain event warnings measuring an accuracy with respect to a plurality of determinations made by the computing entity 10. Alternatively, the rain event warning confidence may be expressed by the number of accurate determinations of a rain event to the total number of determinations of a rain event. As discussed above, the computing entity 10, such as the processor 12, may analyze the sensor information/data (e.g., image data, weather information, environmental data combinations thereof, and/or the like) received from one or more stationary sensors 60. For example, the computing entity 10, such as the processor 12, may be configured to determine the rain event warning confidence by determining a ratio of a number of rain event warnings for which the one or more images within the regions with which the rain event warnings are associated are identified to not represent rain to a total number of rain event warnings. In this regard, the total number of rain event warnings comprises a sum of a number of rain event warnings for which the one or more images within the regions with which the rain event warnings are associated are identified to represent rain and the number of rain event warnings for which the one or more images within the region with which the rain event warnings are associated are identified to not represent rain. As will be noted, the total number of rain event warnings may exclude those for which the images are indeterminate. The computing entity 10, such as the processor 12, may determine the rain event warning confidence based on the following equation:

Rain event warning confidence = $\Sigma$rain event warnings not representing rain / $\Sigma$(rain event warnings representing rain + rain event warnings not representing rain) * 100%    Equation 2

In the above formula, the "rain event warnings not representing rain" refers to a number of instances corresponding with a rain event warning for which a majority of images are identified to not represent rain (i.e., false positive rain event warnings); and "rain event warnings representing rain" refers to a number of instances corresponding with a rain event warning for which a majority of images are identified to represent rain (i.e., true positive rain event warnings). In this regard, for a respective rain event warning, a plurality of images of the relevant time period and the relevant location may evaluated by the processor 12 and a determination may be made as to whether a majority of the images represent rain (which would then be identified as one instance of a "rain event warning representing rain") or whether a majority of the images do not represent rain (which would then be identified as one instance of a "rain event warning not representing rain"). The sum of the rain event warnings representing rain and the rain event warnings not representing rain represent a total number of rain event warnings. In this example, an optimal rain event warning confidence will be low (e.g., close to zero) such that very few false positive rain event warnings will be determined and/or published.

In some embodiments, the computing entity 10 may comprise means, such as processor 12 or the like, for analyzing classification statistics relating to a plurality of rain event warnings and/or publication of the plurality of rain event warnings.

In an example, the computing entity 10, such as the processor 12, analyzes (e.g., determines, computes) statistics corresponding with 141 locations (e.g., polygons) corresponding with rain event warnings, and obtains sensor data/information (e.g., 103 images) from 35 of the 141 locations. In this example, the sensor data/information from the 35 location includes 103 images and the computing entity 10, such as the processor 12, of this example may classify/tag 83 of the 103 images as "rain identified," 14 of the 103 images as "rain not certain," and 6 of the 103 images "rain not identified." (In other embodiments, another computing device may classify/tag the images and transmit the results to the computing entity 10). For each location (e.g., polygon), the computing entity 10, such as the processor 12, determines whether a majority of images corresponding with each location (e.g., polygon) were classified/tagged as "rain identified," "rain not certain," or "rain not identified." For example, the computing entity 10 may determine that 26 of the 35 locations (e.g., polygons) had a majority of images tagged/classified as "rain identified", 3 of the 35 locations had a majority of images tagged/classified as "rain not certain," 2 of the 35 locations had a majority of images tagged/classified as "rain not identified," and 4 of the 35 locations had equal numbers of images tagged/classified as "rain identified" and "rain not certain." In this example, the rain event warning confidence is determined based on the ratio of locations with a majority of images identified as "rain not identified" to the sum of locations with a majority of images identified as "rain not identified" and locations with a majority of images identified as "rain identified." Therefore, applying Equation 2 above, the rain event warning confidence is determined to be:

$$\frac{2}{2+26} * 100\% = 6.25\%$$

Stated differently, in the above example, the rain event warnings were 93.75% accurate (i.e., 100%-6.25%). In some embodiments, an indication based at least in part on the rain event warning confidence may be transmitted to the one or more vehicle apparatuses 20 for display in conjunction with a system or application (e.g., navigation system, mapping system or weather alert system).

At block 409, the computing entity 10 comprises means, such as the processor 12 or the like, for determining whether the rain event warning confidence satisfies a confidence threshold in order to determine whether or not the rain event warning should be published. For example, the computing entity 10, such as the processor 12, may set a rain event warning confidence threshold of 10%, and as a result, require a rain event warning confidence that satisfies the threshold, such as by equaling or being lower than the threshold (e.g., 9%), in order to publish the rain event warning, so as to verify or validate the rain event warning.

Returning to FIG. 3, at block 305 the vehicle apparatus 20 comprises means such as the processor 22, communication interface 26, and/or the like, for receiving instructions (e.g., a message, a signal and/or the like) from the computing entity 10 to cause publication of the rain event warning based on the rain event warning confidence (e.g., if the rain event warning confidence satisfies a rain event warning confidence threshold).

Then at block 307, the vehicle apparatus 20 comprises means, such as the processor 22 or the like, for publishing the rain event warning. Publication of the rain event warning may have any of various forms and, in one embodiment, may comprise a message or indication transmitted to the vehicle apparatus(es) 20 or provided in conjunction with the navigation or mapping system. In some embodiments, the computing entity 10, such as the processor 12, may provide instructions or other information causing a stored rain event warning entry to be provided, such as by causing stored computer instructions to be executed to generate the warning. An updated map may be provided or transmitted to the one or more vehicle apparatuses 20. For example, the computing entity 10 may comprise means, such as the processor 12, communications interface 16, and/or the like, for providing the updated map. For example, the updated map illustrating the location at which the rain event warning was generated may be provided and/or transmitted to a plurality of vehicle apparatuses 20 via the network 50. Based upon the updated map and the indication associated with a location corresponding with a weather condition indicative of rain, a rain event warning may be presented to the driver of the vehicle, such as by the display associated with a navigation or mapping system in which a reference to a weather condition (e.g., rain, fog and/or the like) is associated with a location on a map, audibly via a vehicle entertainment system or the like. In some embodiments, once the computing entity 10 has provided the instructions regarding a rain event warning, the rain event warning may be presented to the vehicle and/or the driver of the vehicle in all instances. Alternatively, the rain event warning may only be presented to the vehicle and/or the driver of the vehicle in an instance in which the vehicle is proximate the location, such as within a predefined distance of the location, and/or in an instance in which the predefined route along which the vehicle is travelling passes within a predefined distance of the location. In some embodiments, the vehicle apparatus 20 includes means, such as the processor 22, the communication interface 26 or the like, for receiving instructions to deactivate the rain event warning in an instance in which the rain event warning fails to satisfy the confidence threshold.

Vehicle Apparatus Operation

As discussed above, FIG. 3 provides a flowchart of operations performed by a vehicle apparatus 20 in communication with the computing entity 10. The vehicle apparatus 20 may be configured to transmit and/or receive information from the computing entity 10, such as by receiving instructions from the computing entity 10. The vehicle apparatus 20 may be configured to utilize or subscribe to a system or application (e.g., a mapping system, navigation system or weather alert system) provided by or otherwise supported by the computing entity 10. The example mapping system may comprise computer-executable instructions embedded therein. When the vehicle apparatus 20, on-board a vehicle, traverses within the specified range of a location corresponding with a weather condition indicative of rain, computer-executable instructions embedded in or associated with the map may be executed to cause publication of the rain event warning.

The vehicle apparatus 20 may include means, such as the processor 22, for initializing the mapping system or navigation system (e.g. a user may launch an application on a computing device comprising an interactive map). The interactive map, or portions thereof, may be received (e.g. from the computing entity which may, in some embodiments be remote from the vehicle apparatus 20) and stored by the vehicle apparatus 20, such as in memory 24. In some embodiments, the computing entity 10, such as the processor 12, the communication interface 16 or the like, may transmit instructions for updating a copy of the interactive map stored by the vehicle apparatus 20. The interactive map may comprise computer-executable instructions embedded therein or otherwise associated therewith. For example, the vehicle apparatus 20 may comprise means, such as processor 22, memory 24, communications interface 26, and/or the like, for receiving, storing and/or updating the interactive map.

In various embodiments, the vehicle apparatus 20 may be determined to be within a specified range of a location corresponding with a rain event warning associated with one or more geographical points, lines or areas, e.g., polygons, of the map. The vehicle apparatus 20 may be, for example, following a route or a predicted route that passes within the specified range of the location corresponding with the rain event warning represented by one or more geographical points, lines or areas on the map.

In some embodiments, the computer-executable instructions may comprise a reference to a function repository stored in association with the map. For example, the function repository may be a reference table, a serialized file, a database, and/or the like. In an example embodiment, the computer-executable instructions may comprise a reference to a function repository stored in the association with the map and one or more coefficients or parameters that are to be used in the calculation or determination of the result of the referenced instructions, function(s), or algorithm(s). In such an embodiment, the referenced instructions, function(s), and/or algorithm(s) may be retrieved and/or accessed from the function repository. For example, the vehicle apparatus 20 may be configured to retrieve and/or access instructions, function(s), and/or algorithm(s) referenced by the computer-executable instructions embedded in the map, from the function repository. For example, the vehicle apparatus 20 may comprise means, such as processor 22, memory 24, and/or the like, for retrieving and/or accessing instructions, function(s), and/or algorithm(s) referenced by the computer-executable instructions, such as the instructions embedded in the map, e.g., a link data record of the map, from the function repository. In some embodiments, the function repository may comprise different instructions based on different road design rules for different countries or geographical or political regions and/or the conventions thereof. In further embodiments, the function repository may consist of different instructions based on the type of vehicle being driven, the time of day, current velocity, and/or the like.

In some example embodiments, the vehicle apparatus 20 may comprise factory programmed instructions, function(s), algorithm(s), and/or the like (e.g., stored in memory 24) that may be defined for global usage (e.g., not defined to be unique with respect to a particular road segment or link) and the embedded computer-executable instructions may comprise one or more coefficients or parameters that are to be used in the calculation or determination of the result of the factory programmed instructions, function(s), or algorithm(s). For example, the factory programmed instructions, function(s), or algorithm(s) may comprise use of sensor information/data collected, captured, gathered, measured, and/or the like by a first sensor of the one or more sensors 30. The embedded computer-executable instructions may cause the vehicle apparatus 20, such as the processor 22, to analyze the sensor information/data differently along a respective portion of the map than is provided for by the factory programmed instructions, function(s), or algorithm(s).

The vehicle apparatus 20 may be configured to transmit a response that includes or is otherwise based on the sensor data. The computer-executable instructions may be executed by the processor 22 to cause analysis of at least a portion of the sensor information/data collected, captured, gathered, measured, and/or the like by the one or more sensors 30 as the vehicle traversed the road segment that passes within a specified range of a location corresponding with a rain event warning and transmission of a response. A response may be transmitted via the network 50, such as to the computing entity 10. For example, the vehicle apparatus 20 may comprise means, such as the processor 22, communications interface 26, and/or the like, for providing a response including, in some embodiments, the sensor data and location data indicating the location at which the sensor data was collected (and, in some instances) a time stamp indicating the time at which the sensor data was collected. In example embodiments, the computing entity 10 may be configured to receive the response from the vehicle apparatus 20. In example embodiments, a response may comprise the sensor data and/or an indication of a result of the analysis of sensor information/data that was caused by execution of the computer-executable instructions embedded in or associated with the map corresponding to the particular portion of the map (e.g. location corresponding with rain event warning).

Additionally, a response may comprise vehicle identification information/data. For example, a response may indicate the type, make, model, trim package, year and/or the like of the vehicle associated with the vehicle apparatus 20, a sensor configuration associated with the vehicle apparatus 20, and/or the like. In some embodiments, the computing entity 10, such as the processor 12, may determine and execute computer-executable instructions that are adapted to analyze the sensor data in a manner that is tailored for a particular type, make, model, trim package, year and/or the like of vehicle or a particular type of sensor configuration associated with the vehicle apparatus 20. As should be understood, in various embodiments, the response may comprise various information/data identifying the vehicle apparatus 20 and/or the corresponding vehicle such that, if desired, the computer-executable instructions assigned to particular portions of the map may be adapted or optimized for a particular vehicle type, make, model, trim package, year, and/or the like and/or a particular sensor configuration associated with the vehicle apparatus 20.

In various embodiments, a response may comprise various other information/data associated with the vehicle and/or the vehicle apparatus 20; the result of the analysis caused by the execution of the computer-executable instructions; the result of the analysis caused by factory programmed instructions, functions, or algorithms; and/or the like, as appropriate for the application.

The vehicle apparatus 20 may include means, such as the processor 22, the communications interface 26 or the like, for receiving a message to cause publication of a rain event warning, from the computing entity 10. In an example embodiment, the message may comprise an update to the interactive map/mapping system, a warning message/alert and/or the like. Based upon the message including, for example, an updated map, associated with a location, a rain event warning may be presented to the driver of the vehicle, such as by the display associated with a navigation or mapping system, audibly via a vehicle entertainment system or the like. Once the vehicle apparatus 20 has received the message to cause publication of a rain event warning, the rain event warning may be presented to the vehicle and/or the driver of the vehicle in all instances. Alternatively, the rain event warning may only be presented to the vehicle and/or the driver of the vehicle in an instance in which the vehicle is proximate the location, such as within a predefined distance of the location, and/or in an instance in which the predefined route along which the vehicle is travelling passes within a predefined distance of the location.

III. Example Apparatuses

The vehicle apparatus 20, stationary sensor 60 and/or computing entity 10 of an example embodiment may be embodied by or associated with a variety of computing devices. The vehicle apparatus 20 may be embodied, for example, by a navigation system including an in-vehicle navigation system, a vehicle control system, a personal navigation device (PND) or a portable navigation device, an advanced driver assistance system (ADAS), a global positioning system (GPS), a cellular telephone, a mobile phone, a personal digital assistant (PDA), a watch, a camera, a computer, and/or other device that can perform navigation-related functions, such as digital routing and map display. The computing entity 10 may be embodied in other types of computing devices, such as a server, a personal computer, a computer workstation, a laptop computer, a plurality of networked computing devices or the like, that are configured to identify a location corresponding with a rain event warning and to provide an indication in an instance in which a vehicle is near a location corresponding with a rain event warning or has a route that extends through the location.

In this regard, FIG. 2A depicts a computing entity 10 and FIG. 2B depicts a vehicle apparatus 20 or a stationary sensor 60 of an example embodiment that may be embodied by various computing devices including those identified above. As shown, the computing entity 10 of an example embodiment may include, may be associated with or may otherwise be in communication with a processor 12 and a memory device 14 and optionally a communication interface 16 and/or a user interface 18. Similarly, a vehicle apparatus 20 or a stationary sensor 60 of an example embodiment may include, may be associated with, or may otherwise be in communication with a processor 22, and a memory device 24, and optionally a communication interface 26, a user interface 28, and/or one or more sensors 30 (e.g., a location sensor such as a GPS sensor; camera(s); 2D and/or 3D LiDAR(s); long, medium, and/or short range RADAR; ultrasonic sensors; electromagnetic sensors; (near-)IR cameras, 3D cameras, 360° cameras, accelerometer(s), gyroscope(s), and/or other sensors that enable the vehicle apparatus 20 or stationary sensor 60 to determine one or more features of the corresponding apparatus's surroundings).

In some embodiments, the processor 12, 22 (and/or co-processors or any other processing circuitry assisting or otherwise associated with the processor) may be in communication with the memory device 14, 24 via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 12, 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12, 22 may be configured to execute instructions stored in the memory device 14, 24 or otherwise accessible to the processor. For example, the processor 22 may be configured to execute computer-executed instructions embedded within a link record of a map tile. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the computing entity 10 and/or vehicle apparatus 20 may include a user interface 18, 28 that may, in turn, be in communication with the processor 12, 22 to provide output to the user, such as a proposed route, and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 14, 24, and/or the like).

The computing entity 10, stationary sensor 60 and/or the vehicle apparatus 20 may optionally include a communication interface 16, 26. The communication interface 16, 26 may be any means such as a device or circuitry embodied in either hardware or a combination of hardware and software that is configured to receive and/or transmit data from/to a network and/or any other device or module in communication with the apparatus. In this regard, the communication interface 16, 26 may include, for example, an antenna (or multiple antennas) and supporting hardware and/or software for enabling communications with a wireless communication network. Additionally or alternatively, the communication interface 16, 26 may include the circuitry for interacting with the antenna(s) to cause transmission of signals via the antenna(s) or to handle receipt of signals received via the antenna(s). In some environments, the communication interface 16, 26 may alternatively or also support wired communication. As such, for example, the communication interface may include a communication modem and/or other hardware/software for supporting communication via cable, digital subscriber line (DSL), universal serial bus (USB) or other mechanisms.

In addition to embodying the computing entity 10 and/or vehicle apparatus 20 of an example embodiment, a navigation system may also include or have access to a geographic database that includes a variety of data (e.g., map information/data) utilized in constructing a route or navigation path and determining the time to traverse the route or navigation path. For example, a geographic database may include data records, road segment or link data records, point of interest (POI) data records and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. In example embodiments, the data records (e.g., node data records, link data records, POI data records, and/or other data records) may comprise computer-executable instructions, a reference to an function repository that comprises computer-executable instructions, one or more coefficients and/or parameters to be used in accordance with an algorithm for performing the analysis, one or more response criteria for providing a response indicating a result of the analysis, and/or the like. In example embodiments, the vehicle apparatus 20 may be configured to execute computer-executable instructions provided by and/or referred to by a data record. In example embodiments, the computing entity 10 may be configured to modify, update, and/or the like one or more data records of the geographic database.

In an example embodiment, the data records represent and comprise road networks, roads, streets, paths and the like, such as used by vehicles, cars, and/or other entities. The roads, streets, and the like may be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example.

Also, remote sensing, such as aerial or satellite photography, can be used. In example embodiments, the geographic database may be updated based on information/data provided by one or more vehicle apparatuses. For example, the computing entity 10 may update the geographic database based on a most preferred version map tile as determined from a plurality of responses received from a plurality of vehicle apparatuses 20, as described elsewhere herein.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies a vehicle apparatus 20 in accordance with an example embodiment may determine the time to traverse a route that includes one or more turns at respective intersections more accurately.

IV. Apparatus, Methods, and Computer Program Products

As described above, FIGS. 3, 4 and 5 illustrate flowcharts of apparatuses 10, 20, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24 of an apparatus employing an embodiment of the present invention and executed by the processor 12, 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A computer-implemented method for determining a rain event warning confidence, the method comprising:
   receiving an indication of the rain event warning for one or more locations;
   for a respective rain event warning, obtaining sensor data in the form of one or more images depicting a weather condition within a region that includes the one or more locations with which the respective rain event warning is associated;
   evaluating the sensor data to determine whether the sensor data is indicative of rain; and
   determining the rain event warning confidence based at least in part on evaluation of the sensor data by:
      determining a ratio of a number of rain event warnings for which the one or more images depicting the weather condition within the region that includes the one or more locations with which the rain event warnings are associated are identified to not represent rain to a total number of rain event warnings, and wherein the total number of rain event warnings comprise a sum of a number of rain event warnings for which the one or more images depicting the weather condition within the region that includes the one or more locations with which the rain event warnings are associated are identified to represent rain and a number of rain event warnings for which the one or more images depicting the weather condition within the region that includes the one or more locations with which the rain event warnings are associated are identified to not represent rain; and causing the rain event warning to be published in an instance in which the rain event warning confidence satisfies a confidence threshold.

2. The method of claim 1, further comprising identifying, for the respective rain event warning, one or more sensors within the region based on the location of the rain event warning.

3. The method of claim 1, wherein obtaining sensor data comprises obtaining sensor data for a time that is within a predefined period of time from a time associated with the respective rain event warning.

4. The method of claim 1, wherein obtaining sensor data comprises obtaining sensor data from one or more stationary sensors within the region with which the respective rain event warning is associated.

5. The method of claim 1, wherein evaluating the sensor data to determine whether the sensor data is indicative of rain comprises:

identifying the one or more images within the regions with which the respective rain event warning is associated to not represent rain in an instance in which a majority of the one or more images are determined to not represent rain; and identifying the one or more images within the regions with which the respective rain event warning is associated to represent rain in an instance in which a majority of the one or more images are determined to represent rain.

6. An apparatus configured to determine a rain event warning confidence, the apparatus comprising processing circuitry and at least one memory including computer program code instructions, the computer program code instructions configured to, when executed by the processing circuitry, cause the apparatus to:

receive an indication of the rain event warning for one or more locations;

for a respective rain event warning, obtain sensor data in the form of one or more images depicting a weather condition within a region that includes the one or more locations with which the respective rain event warning is associated;

evaluate the sensor data to determine whether the sensor data is indicative of rain; and determine the rain event warning confidence based at least in part on evaluation of the sensor data by causing the apparatus to:

determine a ratio of a number of rain event warnings for which the one or more images depicting the weather condition within the region that includes the one or more locations with which the rain event warnings are associated are identified to not represent rain to a total number of rain event warnings, and wherein the total number of rain event warnings comprise a sum of a number of rain event warnings for which the one or more images depicting the weather condition within the region that includes the one or more locations with which the rain event warnings are associated are identified to represent rain and a number of rain event warnings for which the one or more images depicting the weather condition within the region that includes the one or more locations with which the rain event warnings are associated are identified to not represent rain; and cause the rain event warning to be published in an instance in which the rain event warning confidence satisfies a confidence threshold.

7. The apparatus according to claim 6, wherein the computer program code instructions are further configured to, when executed by the processing circuitry, cause the apparatus to, for the respective rain warning event, identify one or more sensors within the region based on the location of the rain event warning.

8. The apparatus according to claim 6, wherein the sensor data comprises sensor data for a time that is within a predefined period of time from a time associated with the respective rain event warning.

9. The apparatus according to claim 6, wherein the computer program code instructions are further configured to, when executed by the processing circuitry, cause the apparatus to obtain the sensor data from one or more stationary sensors within the region with which the respective rain event warning is associated.

10. The apparatus according to claim 6, wherein the sensor data comprises one or more images depicting the weather condition within the region with which the respective rain event warning is associated.

11. The apparatus according to claim 6, wherein the computer program code instructions configured to, when executed by the processing circuitry, cause the apparatus to evaluate the sensor data to determine whether the sensor data is indicative of rain comprises computer program code instructions further configured to, when executed by the processing circuitry, cause the apparatus to:

identify the one or more images within the regions with which the respective rain event warning is associated to not represent rain in an instance in which a majority of the one or more images are determined to not represent rain; and identify the one or more images within the regions with which the respective rain event warning is associated to represent rain in an instance in which a majority of the one or more images are determined to represent rain.

12. A computer program product configured to determine a rain event warning confidence, the computer program product comprising at least one non-transitory computer-readable storage medium having computer executable program code instructions therein, the computer executable program code instructions comprising program code instructions configured, upon execution, to:

receive an indication of the rain event warning for one or more locations;

for a respective rain event warning, obtain sensor data in the form of one or more images depicting a weather condition within a region that includes the location with which the respective rain event warning is associated;

evaluate the sensor data to determine whether the sensor data is indicative of rain; and determine the rain event warning confidence based at least in part on evaluation of the sensor data by:

determining a ratio of a number of rain event warnings for which the one or more images depicting the weather condition within the region that includes the one or more locations with which the rain event warnings are associated are identified to not represent rain to a total number of rain event warnings, and wherein the total number of rain event warnings comprise a sum of a number of rain event warnings for which the one or more images depicting the weather condition within the region that includes the one or more locations with which the rain event warnings are associated are identified to represent rain and a number of rain event warnings for which the one or more images depicting the weather condition within the region that includes the one or more locations with which the rain event warnings are associated are identified to not represent rain; and cause the rain event warning to be published in an instance in which the rain event warning confidence satisfies a confidence threshold.

13. The computer program product according to claim 12, wherein the computer executable program code instructions further comprise program code instructions configured, upon execution, to, for the respective rain event warning, identify one or more sensors within the region based on the location of the rain event warning.

14. The computer program product according to claim 12, wherein the sensor data comprises sensor data for a time that is within a predefined period of time from a time associated with the respective rain event warning.

15. The computer program product according to claim 12, wherein the sensor data comprises one or more images depicting the weather condition within the region with which the respective rain event warning is associated.

16. The method according to claim 1, wherein evaluating the sensor data to determine whether the sensor data is indicative of rain comprises employing a computer vision algorithm to automatically classify the sensor data according to a presence or absence of rain.

17. The apparatus according to claim 6, wherein causing the apparatus to evaluate the sensor data to determine whether the sensor data is indicative of rain comprises causing the apparatus to employ a computer vision algorithm to automatically classify the sensor data according to a presence or absence of rain.

18. The computer program product according to claim 12, wherein the program code instructions configured, upon execution, to evaluate the sensor data to determine whether the sensor data is indicative of rain comprise program code instructions configured, upon execution, to employ a computer vision algorithm to automatically classify the sensor data according to a presence or absence of rain.

* * * * *